(12) United States Patent
Javaid et al.

(10) Patent No.: US 10,293,700 B2
(45) Date of Patent: May 21, 2019

(54) WIRELESS CHARGING SYSTEM FOR ELECTRIC VEHICLE WITH ADJUSTABLE FLUX ANGLE

(71) Applicants: Hyundai America Technical Center, Inc, Superior Township, MI (US); Hyundai Motor Company, Seoul (KR); Kia Motors Corporation, Seoul (KR)

(72) Inventors: Bilal Javaid, Ada, MI (US); Allan Lewis, Windsor (CA); John Robb, Oxford, MI (US); Mohammad Naserian, Windsor (CA)

(73) Assignees: Hyundai America Technical Center, Inc, Superior Township, MI (US); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 369 days.

(21) Appl. No.: 15/387,769

(22) Filed: Dec. 22, 2016

(65) Prior Publication Data

US 2018/0178666 A1 Jun. 28, 2018

(51) Int. Cl.
*B60L 53/39* (2019.01)
*B60L 53/12* (2019.01)
*H02J 7/02* (2016.01)
*B60L 11/18* (2006.01)
(Continued)

(52) U.S. Cl.
CPC .......... *B60L 11/1831* (2013.01); *B60L 5/005* (2013.01); *B60L 53/12* (2019.02); *B60L 53/32* (2019.02);
(Continued)

(58) Field of Classification Search
CPC .............. B60L 11/1831; B60L 11/1837; B60L 11/182; B60L 53/12; B60L 53/39;
(Continued)

(56) References Cited

U.S. PATENT DOCUMENTS

| | | | | |
|---|---|---|---|---|
| 5,573,090 A | * | 11/1996 | Ross | B60L 5/005 |
| | | | | 180/2.1 |
| 9,698,608 B2 | * | 7/2017 | Keeling | H02J 5/005 |

(Continued)

OTHER PUBLICATIONS

Miller, J.M., et al., "Demonstrating Dynamic Wireless Charging of an Electric Vehicle: The Benefit of Electrochemical Capacitor Smoothing," IEEE Power Electronics Magazine, (Mar. 2014), pp. 12-24.

*Primary Examiner* — Nathaniel R Pelton
*Assistant Examiner* — Manuel Hernandez
(74) *Attorney, Agent, or Firm* — Mintz Levin Cohn Ferris Glovsky and Popeo, P.C.; Peter F. Corless

(57) ABSTRACT

A method includes: detecting a position of a moving, wireless charging-capable vehicle which travels over a primary coil of a wireless charging system operable to wirelessly charge the vehicle via a secondary coil installed in the vehicle; controlling the plurality of cross-coil junction units such that electric current flows through one or both of the top coil and the bottom coil in a manner which produces a first angle of magnetic flux for optimally wirelessly charging the vehicle given a position of the primary coil in relation to the detected position of the vehicle; and when a switching time occurs, controlling the plurality of cross-coil junction units to change the flow of electric current through one or both of the top coil and the bottom coil in a manner which produces a second angle of magnetic flux for optimally wirelessly charging the vehicle given the position of the primary coil in relation to an updated position of the vehicle as the vehicle traverses the primary coil.

20 Claims, 17 Drawing Sheets

(51) Int. Cl.
*H02J 50/90* (2016.01)
*H02J 50/10* (2016.01)
*H02J 50/40* (2016.01)
*H02J 50/12* (2016.01)
*B60L 5/00* (2006.01)
*B60L 53/30* (2019.01)

(52) U.S. Cl.
CPC .............. *B60L 53/39* (2019.02); *H02J 7/025* (2013.01); *H02J 50/10* (2016.02); *H02J 50/12* (2016.02); *H02J 50/40* (2016.02); *H02J 50/90* (2016.02); *B60Y 2200/91* (2013.01); *B60Y 2200/92* (2013.01); *B60Y 2400/112* (2013.01)

(58) Field of Classification Search
CPC . B60L 5/005; H02J 50/90; H02J 50/10; H02J 50/40; H02J 50/12; H02J 7/025; B60Y 2200/92; B60Y 2200/91; B60Y 2400/112
USPC .......................................... 320/108; 307/104
See application file for complete search history.

(56) References Cited

U.S. PATENT DOCUMENTS

| | | | |
|---|---|---|---|
| 10,086,715 B2* | 10/2018 | Lewis | B60L 11/1829 |
| 2011/0163542 A1* | 7/2011 | Farkas | B60L 11/005 |
| | | | 290/2 |
| 2012/0217111 A1 | 8/2012 | Boys et al. | |
| 2015/0246614 A1* | 9/2015 | Dames | B60L 5/005 |
| | | | 191/10 |
| 2016/0023557 A1* | 1/2016 | Dimke | B60L 5/42 |
| | | | 320/108 |
| 2016/0134126 A1* | 5/2016 | Tillotson | H01F 38/14 |
| | | | 307/104 |
| 2016/0149432 A1* | 5/2016 | Knepper | H02J 7/025 |
| | | | 320/108 |
| 2016/0190815 A1* | 6/2016 | Keeling | H02J 5/005 |
| | | | 307/104 |
| 2017/0282732 A1* | 10/2017 | Lewis | B60L 11/1829 |

* cited by examiner

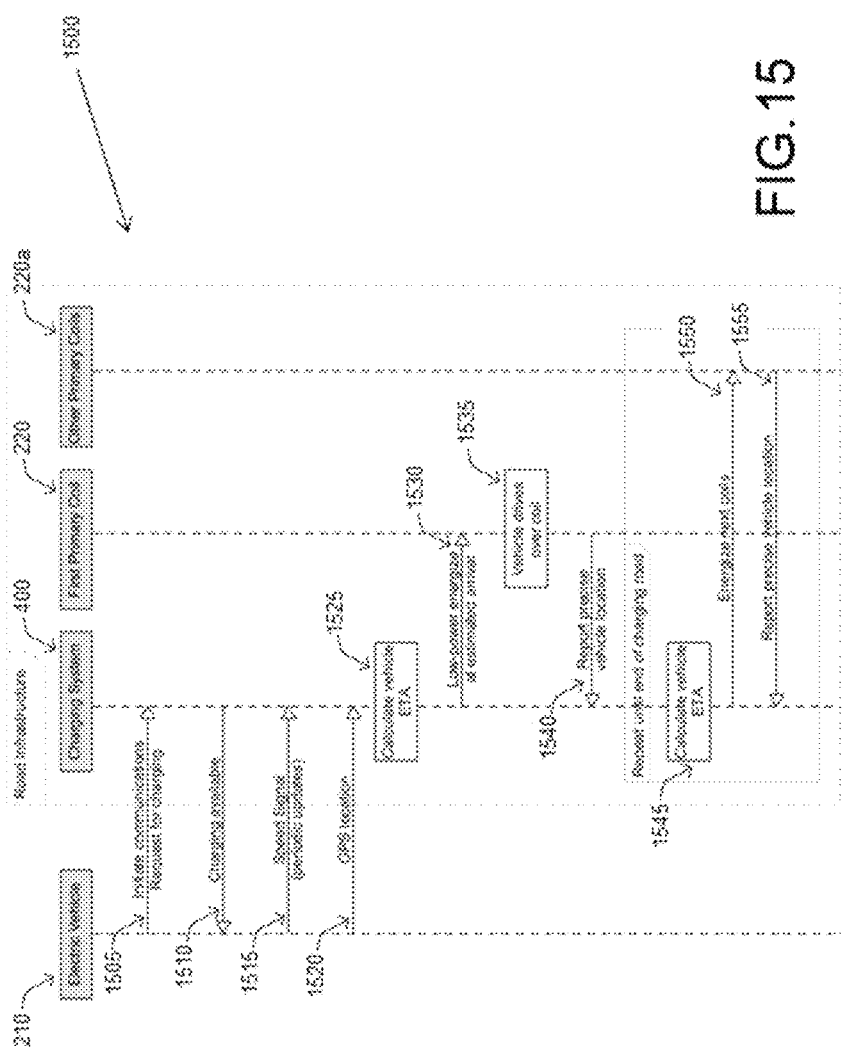

WIRELESS CHARGING SYSTEM FOR ELECTRIC VEHICLE WITH ADJUSTABLE FLUX ANGLE

TECHNICAL FIELD

The present disclosure relates generally to wirelessly charging electric or hybrid electric vehicles, and more particularly, to a wireless charging system for electric vehicle with an adjustable flux angle.

BACKGROUND

Recently, technology relating to electric vehicles (EVs) and hybrid electric vehicles (HEVs) has been rapidly developing. EVs and HEVs are powered, at least in part, by electricity, and these vehicles often collect and store electricity, or in other words, are charged, from off-vehicle sources. As such, various methods of charging EVs and HEVs have been explored. In particular, techniques for wireless charging, or inductive charging, have been the subject of considerable research.

Wireless charging, as opposed to wired charging, improves durability and longevity of the charging components by limiting contact and exposure of the components, increases safety by concealing potentially dangerous wires and connection interfaces, and enhances versatility by allowing charging stations to be implemented in a variety of ways (e.g., as a portable charging pad, embedded in a parking lot or road, etc.). To these ends, wireless charging relies on an electromagnetic field to transfer energy between a charging station (e.g., wireless charging assembly) and an electrical device, such as a smart phone, a laptop, or an electric vehicle, as in the present case. Energy is sent through an inductive coupling formed between the wireless charging assembly and the device. Typically, an induction coil in the wireless charging assembly (i.e., primary coil) uses electricity, often provided from the power grid, to create an alternating electromagnetic field. Parameters of the coil design include the radius, shape, number of turns, and spacing between turns, which are designed for the specific application. An induction coil in the electrical device (i.e., secondary coil) may then receive power from the generated electromagnetic field and convert it back into electrical current to charge its battery. As a result, the primary and secondary induction coils combine to form an electrical transformer, whereby energy can be transferred between the two coils through electromagnetic induction.

Notably, efficient wireless power transfer between the primary and secondary coils depends on proper alignment between the two coils. Misalignment occurs when the primary coil is laterally offset from the secondary coil, resulting in a loss of power transfer efficiency because the incident magnetic flux on the secondary coil is not at the optimal angle. For illustration, FIG. 1 shows an example primary coil conventionally used for wireless power transfer. The primary coil 100 includes multiple turns and allows for current to flow therethrough. Current flowing through the coil 100 creates an electromagnetic field with a magnetic flux 110. A basic primary coil configuration, such as primary coil 100, results in a magnetic flux direction which is straight upwards, as shown in FIG. 1.

However, the angle of the resultant magnetic flux 110 will not allow for optimal power transfer unless a secondary coil is positioned directly above the primary coil 100. As an example, in the case of wirelessly charging an electric vehicle using a charging pad positioned on the ground, or a charging system embedded in the ground, if the vehicle is not properly parked over the charger, the secondary coil installed in the vehicle will be misaligned with the primary coil transferring energy. Therefore, the electric vehicle charge process will be less efficient. While a slight misalignment can decrease charging efficiency, causing wireless charging to take longer than normal, a larger misalignment can prevent wireless charging entirely.

SUMMARY

The present disclosure provides techniques for wirelessly charging a moving vehicle—such as an electric vehicle, hybrid electric vehicle, or the like—in a manner which reduces drops in wireless power transfer efficiency when an induction coil (i.e., secondary coil) installed in the vehicle is not in direct alignment with a power transmitter coil (i.e., primary coil). This is particularly beneficial in a dynamic wireless charging system (or dynamic charging system) which includes multiple power transmitting coils embedded in a roadway designed to charge a vehicle in motion as the vehicle travels over the embedded coils. As described herein, the power transmitting coil includes at least two parallel coils, each coil separated by a distance z with cross-coil junction units between them. The cross-coil junction units couple the parallel coils to one another and can be controlled (e.g., by a charging controller) to guide electric current through specific parts of the coils and effectively create different current flow configurations. Therefore, an optimal current flow configuration can be selected for producing an angle of magnetic flux that maximizes wireless charging efficiency given the position of the power transmitting coil in relation to the induction coil. These techniques create better power transfer efficiency when the coils are misaligned, and as a result, vehicles can be charged over a larger span of distance from a given power transmitting coil.

According to embodiments of the present disclosure, a method includes: detecting a position of a moving, wireless charging-capable vehicle which travels over a primary coil of a wireless charging system operable to wirelessly charge the vehicle via a secondary coil installed in the vehicle, whereby the primary coil includes a top coil and a bottom coil that are substantially parallel to one another, the top coil and the bottom coil coupled to one another via a plurality of cross-coil junction units that permit electric current to pass from one of the top coil and the bottom coil to the other of the top coil and the bottom coil; controlling the plurality of cross-coil junction units such that electric current flows through one or both of the top coil and the bottom coil in a manner which produces a first angle of magnetic flux for optimally wirelessly charging the vehicle given a position of the primary coil in relation to the detected position of the vehicle; and when a switching time occurs, controlling the plurality of cross-coil junction units to change the flow of electric current through one or both of the top coil and the bottom coil in a manner which produces a second angle of magnetic flux for optimally wirelessly charging the vehicle given the position of the primary coil in relation to an updated position of the vehicle as the vehicle traverses the primary coil. The first angle of magnetic flux is different than the second angle of magnetic flux.

The switching time may be a time at which wireless power transfer efficiency between the primary coil and the secondary coil will improve by altering an angle of the magnetic flux produced by the primary coil. In this regard, the method may further include: calculating the switching time according to a speed of the vehicle and the detected position of the vehicle. Also, the method may further include: calculating a switching interval according to the speed of the vehicle, whereby the switching time occurs once the switching interval has elapsed after activation of the wireless charging.

As the vehicle traverses the primary coil, the first angle of magnetic flux may be produced when the secondary coil is at a first position, and the second angle of magnetic flux may be produced when the secondary coil is at a second position that is forward the first position in a moving direction of the vehicle.

When another switching time occurs, the method may further include: controlling the plurality of cross-coil junction units to change the flow of electric current through one or both of the top coil and the bottom coil in a manner which produces a third angle of magnetic flux for optimally wirelessly charging the vehicle given the position of the primary coil in relation to another updated position of the vehicle as the vehicle traverses the primary coil, whereby the third angle of magnetic flux is different than the first and second angles of magnetic flux. In this regard, the method may further include: calculating a switching interval according to a speed of the vehicle, whereby the other switching time occurs once the switching interval has elapsed after occurrence of the switching time. As the vehicle traverses the primary coil, the first angle of magnetic flux may be produced when the secondary coil is at a first position, the second angle of magnetic flux may be produced when the secondary coil is at a second position that is forward the first position in a moving direction of the vehicle, and the third angle of magnetic flux may be produced when the secondary coil is at a third position that is forward the first and second positions in the moving direction of the vehicle. Moreover, as the vehicle traverses the primary coil, the first angle of magnetic flux may be produced when the secondary coil is positioned to a first side of the primary coil, the second angle of magnetic flux may be produced when the secondary coil is positioned directly above the primary coil, and the third angle of magnetic flux may be produced when the secondary coil is positioned to a second side of the primary coil opposite the first side.

The detecting of the position of the vehicle may include: receiving GPS information from the vehicle; and estimating the position of the vehicle based on the received GPS information.

In some cases, the primary coil may be one of a plurality of primary coils arranged sequentially in the wireless charging system. In this regard, the method may further include: monitoring a first primary coil of the plurality of primary coils; detecting the position of the vehicle as the vehicle traverses the first primary coil; and activating a second primary coil of the plurality of the primary coils subsequent to the first primary coil based on the position of the vehicle detected as the vehicle traverses the first primary coil. The detecting of the position of the vehicle as the vehicle traverses the first primary coil may include: activating a low-power mode of the first primary coil; monitoring a level of voltage or current in the first primary coil; and determining the vehicle is positioned directly above the first primary coil when a change in the level of voltage or current in the primary coil is identified as the vehicle traverses the first primary coil. Also, the method may further include: estimating a time at which the vehicle will arrive at the second primary coil according to the position of the vehicle detected as the vehicle traverses the first primary coil; and activating the second primary coil as the vehicle at the estimated time.

When the vehicle is positioned such that the secondary coil is misaligned with the primary coil, the first or second angle of magnetic flux for optimally wirelessly charging the vehicle may be an angle offset from a vertical axis extending upwardly from the primary coil.

In addition, one end of each cross-coil junction unit may be connected to the top coil, and another end of each cross-coil junction unit may be connected to the bottom coil. Also, the plurality of cross-coil junction units may be disposed along one line traversing a diameter of the top coil and the bottom coil, or the plurality of cross-coil junction units may be disposed along multiple lines traversing the diameter of the top coil and the bottom coil. When the plurality of cross-coil junction units are disposed along multiple lines traversing the diameter of the top coil and the bottom coil, each line of cross-coil junction units may be angularly offset from an adjacent line of cross-coil junction units by any suitable amount, such as 45 degrees.

Furthermore, according to embodiments of the present disclosure, a wireless charging system includes: a primary coil that is operable to wirelessly charge a moving, wireless charging-capable vehicle which travels over the primary coil. The primary coil charges the vehicle via a secondary coil installed in the vehicle, the primary coil including a top coil and a bottom coil that are substantially parallel to one another, the top coil and the bottom coil coupled to one another via a plurality of cross-coil junction units that permit electric current to pass from one of the top coil and the bottom coil to the other of the top coil and the bottom coil. The wireless charging system also includes a wireless charging controller configured to: detect a position of the vehicle which travels over the primary coil, control the plurality of cross-coil junction units such that electric current flows through one or both of the top coil and the bottom coil in a manner which produces a first angle of magnetic flux for optimally wirelessly charging the vehicle given a position of the primary coil in relation to the detected position of the vehicle, and when a switching time occurs, control the plurality of cross-coil junction units to change the flow of electric current through one or both of the top coil and the bottom coil in a manner which produces a second angle of magnetic flux for optimally wirelessly charging the vehicle given the position of the primary coil in relation to an updated position of the vehicle as the vehicle traverses the primary coil. The first angle of magnetic flux is different than the second angle of magnetic flux.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 15 illustrates an example simplified charging process in a dynamic charging system including a series of primary coils.

Figure 1:
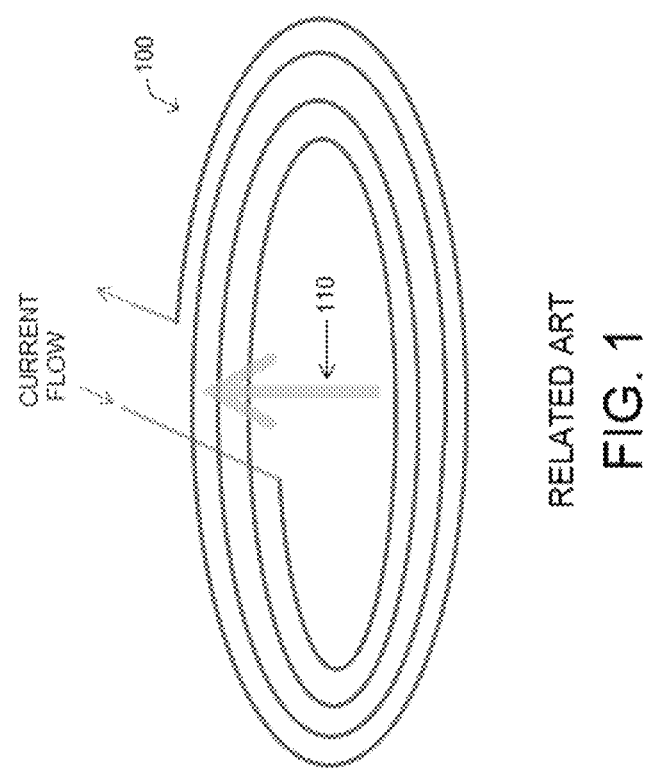
FIG. 1 illustrates an example primary coil conventionally used for wireless power transfer.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, a wireless charging-capable vehicle includes any vehicle which is operable to be wirelessly charged, such as an electric vehicle (EV), hybrid electric vehicle (HEV), and the like. An EV is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, an HEV is a vehicle that has two or more sources of power, for example both gasoline-based power and electric-based power.

Wireless charging, wirelessly transferring power, or the like, may refer to transferring any form of energy associated with electric fields, magnetic fields, electromagnetic fields, or otherwise from a transmitter to a receiver without the use of physical electrical conductors (e.g., power may be transferred through free space). The power output from a first (e.g., "primary") coil into a wireless field (e.g., a magnetic field) may be received or captured by a second (e.g., "secondary" or "receiving") coil to achieve power transfer.

Figure 2:
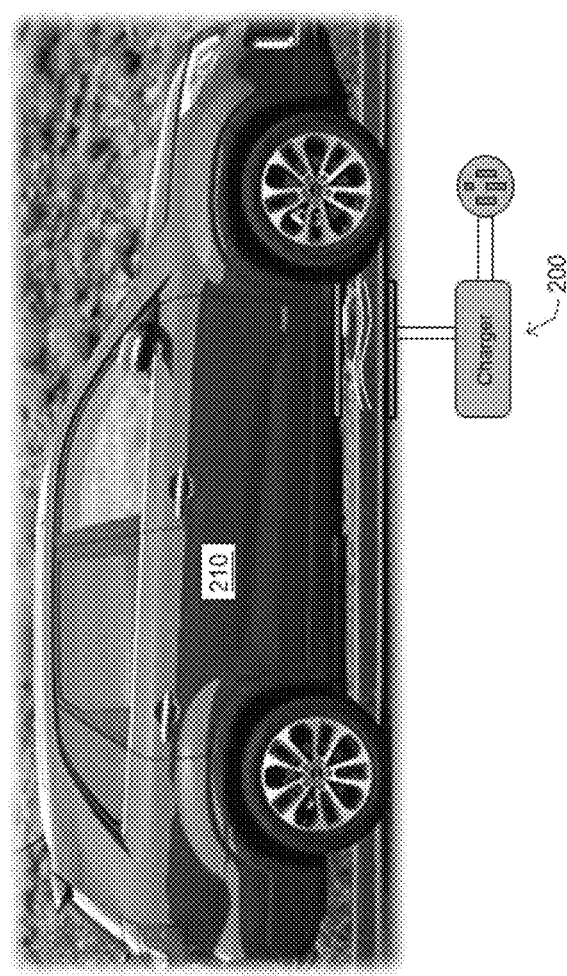
FIG. 2 illustrates an example depiction of a wireless charging-capable vehicle in a charging position proximate a wireless charging system.

For instance, FIG. 2 illustrates an example depiction of a wireless charging-capable vehicle in a charging position proximate a wireless charging system. As shown in FIG. 2, a vehicle 210 may be an EV, HEV, or the like, that is capable of being wirelessly charged. An inductive coil (i.e., secondary coil) may be installed in the vehicle 210 for receiving energy wirelessly transmitted from an inductive coil of a wireless charging system (via an electromagnetic field generated through an inductive coupling between the coils). The secondary coil is typically connected to an impedance matching circuit, a rectifier, and then a load. The vehicle 210 may be aligned with the wireless charging system 200, as shown in FIG. 2, in order to wirelessly receive energy from the charging system 200 (the process of which being described hereinabove).

The wireless charging system 200 may embody a primary coil including one or more induction coils that uses electricity to create an electromagnetic field and, consequently, wirelessly charge the nearby vehicle 210. The wireless charging system 200 may be connected to and receive electric current from a local power distribution center (e.g., power grid), or any other suitable energy source. The wireless charging system 200 may be positioned in any suitable area (e.g., a parking spot in a parking lot, a garage, roadway, etc.) and implemented in any suitable manner, such as a portable charging pad or embedded in or under the ground (either partially or entirely). Or, the wireless charging system 200 may consist of an array of primary coils embedded in or under the ground for dynamic charging purposes. In any event, the wireless charging system 200 is positioned and implemented such that the vehicle 210 can be driven and/or parked in a charging position sufficiently proximate to the wireless charging system 200, allowing the vehicle 210 to wirelessly receive electricity transferred from the charging system 200. The primary coil can be driven with an alternating current to produce a time-varying magnetic field to induce an electromagnetic force in the secondary coil, resulting in the wireless transference of power.

Additionally, it is understood that one or more of the below methods, or aspects thereof, may be executed by at least one controller (e.g., charging controller, wireless charging controller, etc.). The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to embodiments of the present disclosure, the disclosed techniques allow for wirelessly charging a moving vehicle—such as an electric vehicle, hybrid electric vehicle, or the like—in a manner which reduces drops in wireless power transfer efficiency when an induction coil (i.e., secondary coil) installed in the vehicle is not in direct alignment with a power transmitter coil (i.e., primary coil). This is particularly beneficial in a dynamic charging system which includes multiple power transmitting coils embedded in a roadway designed to charge a vehicle in motion as the vehicle travels over the embedded coils.

Figure 3:
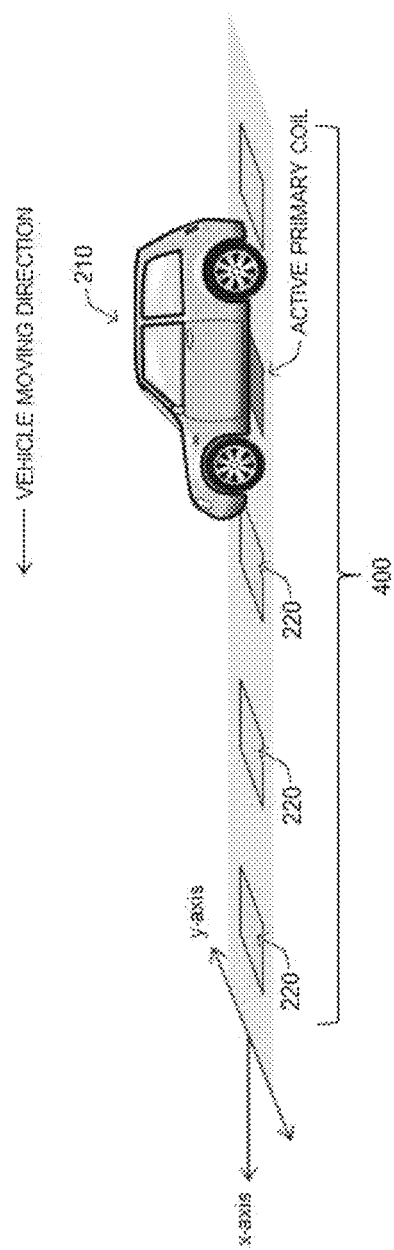
FIG. 3 illustrates an example depiction of a wireless charging-capable vehicle traversing a dynamic wireless charging system.

In this regard, FIG. 3 illustrates an example depiction of a wireless charging-capable vehicle traversing a dynamic wireless charging system. As shown in FIG. 3, a dynamic wireless charging system (or simply dynamic charging system) 400 includes a series of power transmitters—more specifically, power transmitting coils (i.e., primary coils) 220—embedded in the ground (such as a roadway) capable of wirelessly transmitting power to a vehicle 210 as it travels over the coils. Ideally, the dynamic charging system 400 excites the series of power transmitting coils 220 sequentially to coordinate with the movement of the vehicle 210 traveling overhead. By doing so the primary coil 220 which is closest to a secondary coil installed in the vehicle 210 at a given moment is activated, as shown in FIG. 3, and the energized primary coil changes as the vehicle 210 traverses the coils.

Figure 4:
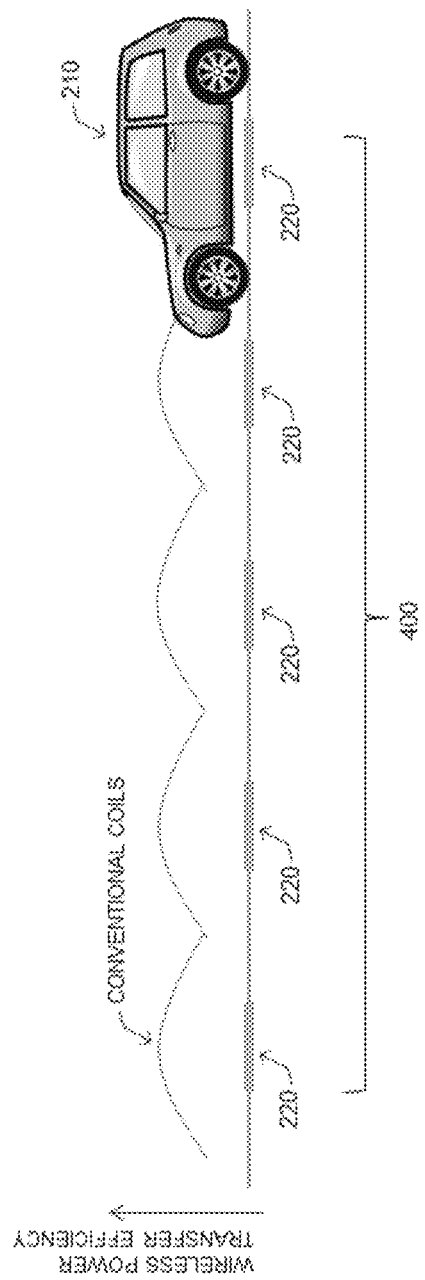
FIG. 4 illustrates an example depiction of change in wireless power transfer efficiency as a wireless charging-capable vehicle traverses a dynamic wireless charging system.

FIG. 4 illustrates an example depiction of change in wireless power transfer efficiency as a wireless charging-capable vehicle traverses a dynamic wireless charging system. The waveform shown in FIG. 4 represents the wireless power transfer efficiency when the vehicle 210 is at a corresponding position while traversing the dynamic charging system 400. Optimal coupling and thus highest power transfer efficiency occurs when the vehicle 210 is directly above the primary coil 220. Meanwhile, poorest coupling and thus lowest efficiency occurs when the vehicle 210 is positioned half-way between two coils 220.

In detail, power transfer efficiency can be calculated according to the following formula:

$$\eta = \frac{k^2}{k^2 + \frac{1}{Q_1 Q_2}}$$

Here, k is the coupling coefficient, $Q_1$ and $Q_2$ are the Q-factors of the primary and secondary resonance circuits of the primary and secondary coils, respectively. It can be seen that a higher coupling coefficient results in greater power transfer efficiency. Conversely, when the coils are positioned far from each other, or laterally misaligned, the coupling coefficient decreases. This causes the drop in wireless power transfer efficiency shown in FIG. 4. As such, increasing the coupling coefficient between the primary coils 220 and the secondary coil installed in the vehicle 210 when the vehicle 210 is positioned between two primary coils 220 can improve the overall wireless power transfer efficiency during dynamic charging.

The coupling coefficient relates to the amount of magnetic flux 110 from the primary coil 220 incident on the secondary coil. For instance, when the secondary coil of the vehicle 210 is positioned directly above a primary coil 220, the coupling coefficient is high since the flux vector resulting from electric current flowing through the primary coil 220 points directly upward at the secondary coil (assuming the primary coil 220 is flat with respect to the ground in which it is embedded), causing nearly all of the magnetic flux 110 generated by the primary coil 220 to interact with the secondary coil. On the other hand, the coupling coefficient is low when the secondary coil is laterally offset from the primary coil 220 since the resultant flux vector is not directly incident on the secondary coil, causing a smaller amount of the magnetic flux 110 generated by the primary coil 220 to interact with the secondary coil and resulting in a smaller mutual inductance value.

Figure 5:
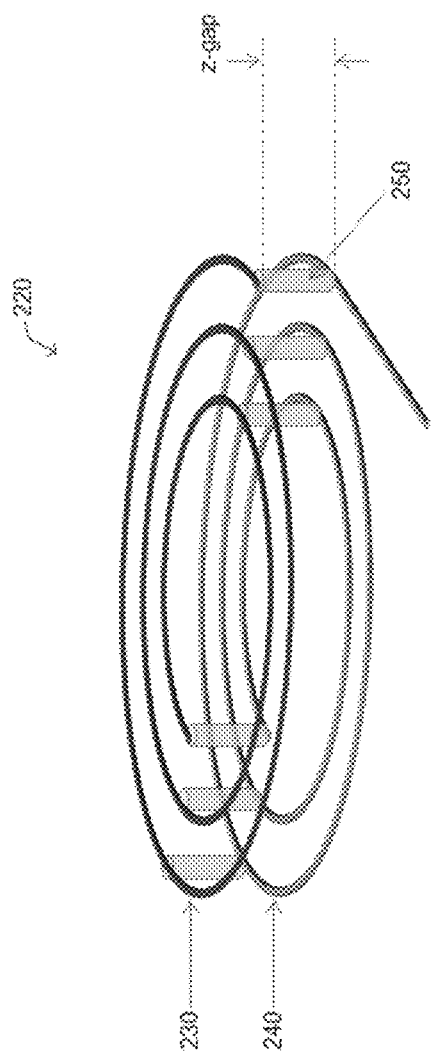
FIG. 5 illustrates an example power transmitter coil assembly according to embodiments of the present disclosure.

To remedy the above situation where mutual inductance is low when the primary and secondary coils are misaligned, a primary coil design having an adjustable magnetic flux angle is described herein. In this regard, FIG. 5 illustrates an example power transmitter coil assembly according to embodiments of the present disclosure. As shown in FIG. 5, the primary coil 220 may feature two layers of coils: a top coil 230 and a bottom coil 240. Though FIG. 5 depicts the primary coil 220 as having two layers of coils, additional layers of coils may be added. The top coil 230 and bottom coil 240 may be positioned such that they are substantially parallel to each other. The top coil 230 may be separated from the bottom coil 240 by a distance z, i.e., the "z-gap." Parameters for the top and bottom coils, including radius, number of turns, shape, wire material, and the like, can be variously set. However, both the top and bottom coils should have the same parameters and should be positioned so as to directly oppose each other, as shown in FIG. 5.

The top coil 230 may be coupled to the bottom coil 240 via a series of cross-coil junction units 250. The cross-coil junction units 250 may be disposed between the top coil 230 and bottom coil 240 and extend across the z-gap, thereby coupling the top coil 230 and bottom coil 240. One end of each cross-coil junction unit 250 may be connected to the top coil 230, and the other end of each cross-coil junction unit 250 may be connected to the bottom coil 240. The cross-coil junction units can be controlled (e.g., by a charging controller) to guide electric current through specific parts of the top and bottom coils and effectively create different current flow configurations. Because altering the current flow through the top and bottom coils alters the angle of magnetic flux 110, as described in further detail below, an optimal current flow configuration can be selected for producing an angle of magnetic flux 110 that maximizes wireless charging efficiency given the position of the primary coil 220 in relation to the secondary coil. These techniques allow for adjustment of the magnetic flux angle without any physically moving parts (e.g., mechanically tilting coils), along with greater misalignment tolerance and the capability to charge the vehicle 210 over a larger span of distance from a given power transmitting coil.

Figure 6:
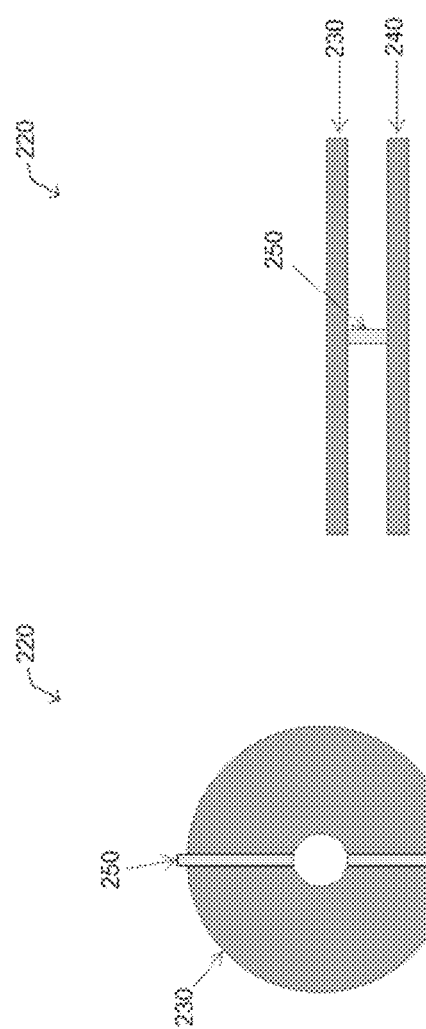
FIGS. 6A and 6B illustrate example simplified additional views of the primary coil and cross-coil junction units.

Additional views are illustrated in FIGS. 6A and 6B. FIG. 6A illustrates an example simplified top view of the primary coil and cross-coil junction units; and FIG. 6B illustrates an example simplified side view of the primary coil and cross-coil junction units. As shown, the primary coil 220 may include a single row of cross-coil junction units 250. That is, the cross-coil junction units 250 may be disposed along one line traversing a diameter of the top coil 230 and the bottom coil 240. Additional rows of cross-coil junction units 250 traversing the diameter of the coils may be added, as shown in detail below.

The cross-coil junction units 250 can be controlled to guide electric current through specific portions of the top and bottom coils and effectively create different current flow configurations. To this end, each cross-coil junction unit 250 may include an electrical switching element (e.g., a switch or other similar component) that can be controlled to enable the electric current to be routed through the cross-coil junction unit 250 from a specific portion of the top coil 230 to a specific portion of the bottom coil 240, or vice versa. By routing electric current through specific portions of the coils, multiple different current flow configurations can be created, whereby each current flow configuration results in a unique angle of magnetic flux 110.

Figure 7:
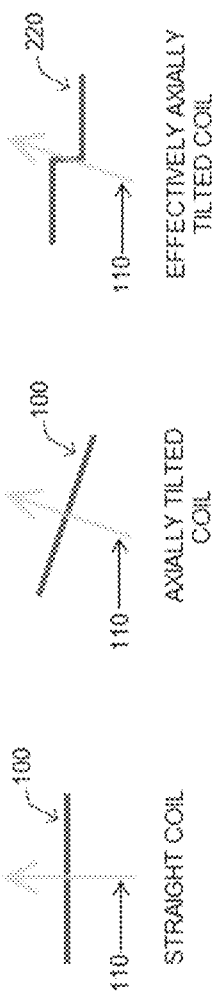
FIGS. 7A-7C illustrate example simplified side views of current flowing through a power transmitting coil and the resultant magnetic flux.

As is known in the art, magnetic flux is the product of the average magnetic field times the perpendicular area that it penetrates. In the case of current flowing through a circular coil, the resulting magnetic flux direction is perpendicular to a plane in which the current flows. In this regard, FIGS. 7A-7C illustrate example simplified side views of electric current flowing through a power transmitting coil and the resultant magnetic flux. As shown in FIG. 7A, when a typical power transmitting coil, e.g., primary coil 100 in FIG. 1, is flat with respect to the ground, the magnetic flux 110 resulting from current flowing through the coil 100 extends perpendicularly from the plane of the coil 100 along a vertical axis extending upwardly from the ground. Similarly, as shown in FIG. 7B, when the primary coil 100 is axially tilted with respect to the ground, the magnetic flux 110 resulting from current flowing through the coil 100 extends perpendicularly from the plane of the coil 100 at an angle that is offset from the vertical axis. The angular offset of the magnetic flux from the vertical axis is equivalent to the angular offset of the coil 100 from the ground.

Meanwhile, as shown in FIG. 7C, the primary coil 220 is straight with respect to the ground, similar to the primary coil 100 in FIG. 7A. However, in accordance with embodiments of the present disclosure, the primary coil 220 includes a top coil 230 and a bottom coil 240 coupled together by cross-coil junction units 250. If the cross-coil junction units 250 in the primary coil 220 assembly are controlled (e.g., a switching element in a cross-coil junction unit is set) such that current flows through a section of the top coil 230 and a section of the bottom coil 240, as shown in FIG. 7C (only the sections of coil through which current flows are illustrated), the resultant magnetic flux 110 can be angularly offset from the vertical axis, similar to the magnetic flux 110 in FIG. 7B, even though the primary coil 220 is parallel to the ground. Therefore, various angles of magnetic flux 110 can be achieved using the primary coil 220 by controlling the cross-coil junction units 250 to route electric current through specific sections of the top coil 230 and the bottom coil 240.

Figure 8:
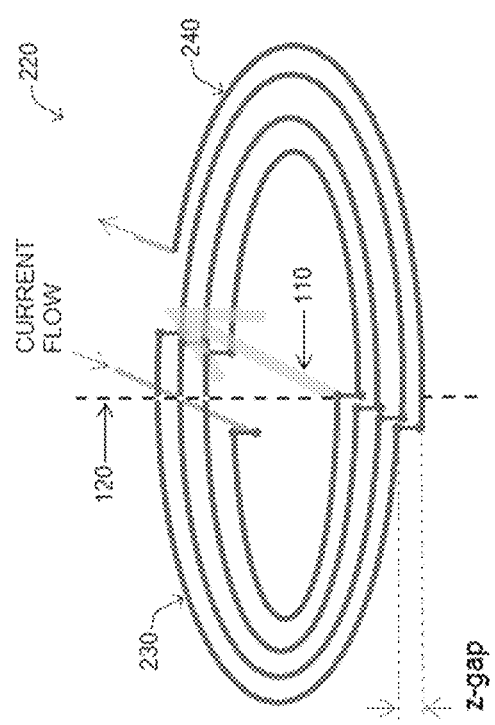
FIG. 8 illustrates an example primary coil with current flowing though sections of the top and bottom coils in accordance with embodiments of the present disclosure.

FIG. 8 illustrates an example primary coil with current flowing though sections of the top and bottom coils in accordance with embodiments of the present disclosure. As shown in FIG. 8, the cross-coil junction units 250 disposed between the top and bottom coils may be controlled such that electric current flows through a section of the top coil 230 and a section of the bottom coil 240. For demonstration purposes only the sections of coil through which current flows are illustrated in FIG. 8. As a result, the angle of the resultant magnetic flux 110 is offset from a vertical axis 120 extending upwardly from the primary coil 220, in contrast to the conventional coil assembly 100 and resultant magnetic flux 110 shown in FIG. 1.

Accordingly, various angles of magnetic flux 110 can be achieved with the primary coil 220 by causing electric current to pass through the cross-coil junction units 250, which routes current through specific sections of the top coil 230 and the bottom coil 240. Each current flow configuration can produce a unique angle of magnetic flux 110 for wirelessly charging the vehicle 210 with optimal efficiency given the degree of alignment between the primary coil 220 and secondary coil installed in the vehicle 210, and a current flow configuration which achieves maximum wireless power transfer efficiency given the position of the primary coil in relation to the secondary coil 320 can be used.

Figure 9:
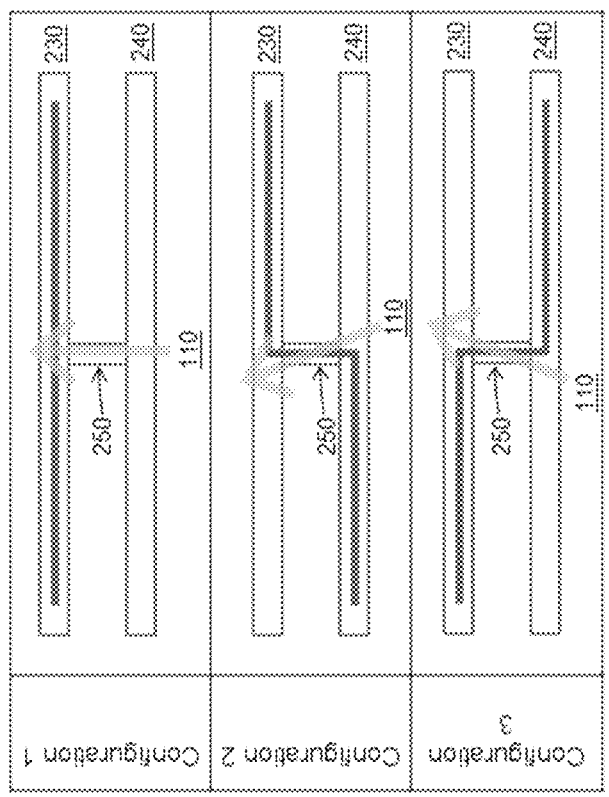
FIG. 9 illustrates a plurality of example current flow configurations for achieving varying magnetic flux angles.

In this regard, FIG. 9 illustrates a plurality of example current flow configurations for achieving varying magnetic flux angles. The solid line drawn through portions of the top coil 230 and/or bottom coil 240 indicates a flow of electric current. While FIG. 9 demonstrates three exemplary current flow configurations, the present disclosure is not limited thereto (e.g., see FIGS. 11 and 12). The number of current flow configurations can vary according to the positioning of the cross-coil junction units 250 and the number of coil layers in the primary coil 220, which in this case equals two (i.e., top layer 230 and bottom layer 240).

In the first exemplary current flow configuration ("Configuration 1"), electric current only flows through the top coil 230. This occurs when electric current flows only through the top coil 230, i.e., no electric current passes through the cross-coil junction units 250, thereby producing a magnetic flux 110 parallel to the vertical axis 120 extending from the primary coil 220. This configuration is effectively equivalent to the conventional primary coil 100 and resultant magnetic flux 110 shown in FIG. 1 and is ideal when the secondary coil of the vehicle 210 is positioned directly above the primary coil 220.

In the second exemplary current flow configuration ("Configuration 2"), electric current flows through a section of the top coil 230 and a section of the bottom coil 240. Specifically, from the perspective shown in FIG. 8, electric current flows through a left section of the bottom coil 240, passes through the cross-coil junction unit 250, and flows through a right section of the top coil 230. This flow configuration results in a magnetic flux 110 angle that is offset to the left of the vertical axis 120. (The terms "left" and "right" are used herein merely for the purpose of simplification, as the directivity of the coils will change based on the viewer's position in relation to the coils.)

In the third exemplary current flow configuration ("Configuration 3"), electric current again flows through a section of the top coil 230 and a section of the bottom coil 240. Specifically, from the perspective shown in FIG. 8, electric current flows through a left section of the top coil 230, passes through the cross-coil junction unit 250, and flows through a right section of the bottom coil 240. This flow configuration results in a magnetic flux 110 angle that is offset to the right of the vertical axis 120 extending from the primary coil 220.

Notably, the angle of the magnetic flux 110 in the second and third current flow configurations relative to the directly vertical magnetic flux in the first current flow configuration is proportional to the ratio z/R, where z is the vertical distance between the top and bottom coils, and R is the average coil radius. Thus, the angular offset (ϕ) of the magnetic flux 110 with respect to the vertical axis 120 may vary according to the following formula:

$$\phi \propto z/R$$

Here, the angular offset (ϕ) of the magnetic flux 110 increases as the distance between the top and bottom coils increases and decreases as the average radius of the top and bottom coils increases.

Figure 10:
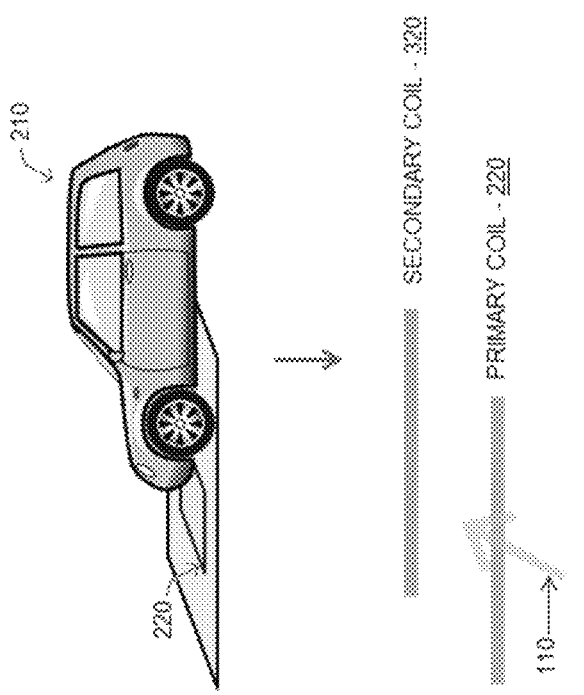
FIG. 10 illustrates an example optimal magnetic flux angle amid a misalignment of the primary and secondary coils.

FIG. 10 illustrates an example optimal magnetic flux angle amid a misalignment of the primary and secondary coils. As shown in FIG. 10, a driver of a wireless charging-capable vehicle 210 (e.g., electric vehicle, hybrid electric vehicle, etc.) may drive to a wireless charging system 200 (or dynamic charging system 400) in order to wirelessly charge the vehicle 210. The wireless charging system 200 can use various techniques—described in further detail below—to detect a position of the vehicle 210 and thereby determine the degree of alignment (or misalignment) between the secondary coil 320 of the vehicle 210 and the primary coil 220 of the wireless charging system 200. A wireless charging controller can then automatically control the cross-coil junction units 250 such that electric current flows through the primary coil 220 to produce an optimal angle of magnetic flux 110 for wirelessly charging the vehicle 210 given a position of the primary coil 220 in relation to a position of the secondary coil 320.

For instance, in the scenario depicted in FIG. 10, the vehicle 210 is located in a charging position proximate to the wireless charging system 200. However, the secondary coil 320 and the primary coil 220 are not properly aligned. Thus, a conventional primary coil 100 producing a vertical magnetic flux 110, as shown in FIG. 1, cannot efficiently transfer power to the secondary coil 320 in this case. Instead, an angled magnetic flux 110 that is directed toward the secondary coil 320 is needed in order to achieve maximum charging efficiency.

In this case, the wireless charging controller can create a current flow configuration that produces an optimal magnetic flux 110 for wirelessly charging the vehicle 210. With reference to FIG. 9, the third current flow configuration can be selected, as the magnetic flux 110 resulting from electric current flowing through the primary coil 220 in the third current flow configuration is offset from the vertical axis 120 and directed toward the secondary coil 320. That is, the resultant magnetic flux 110 is optimal for wirelessly charging the vehicle 210 given a position of the primary coil 220 in relation to a position of the secondary coil 320, as compared to the other current flow configurations.

Figure 11:
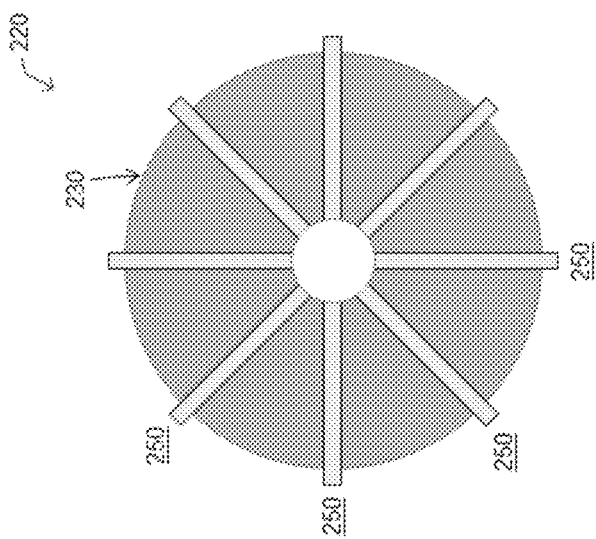
FIG. 11 illustrates an example simplified top view of the primary coil embodying an alternate arrangement of cross-coil junction units.
Figure 12:
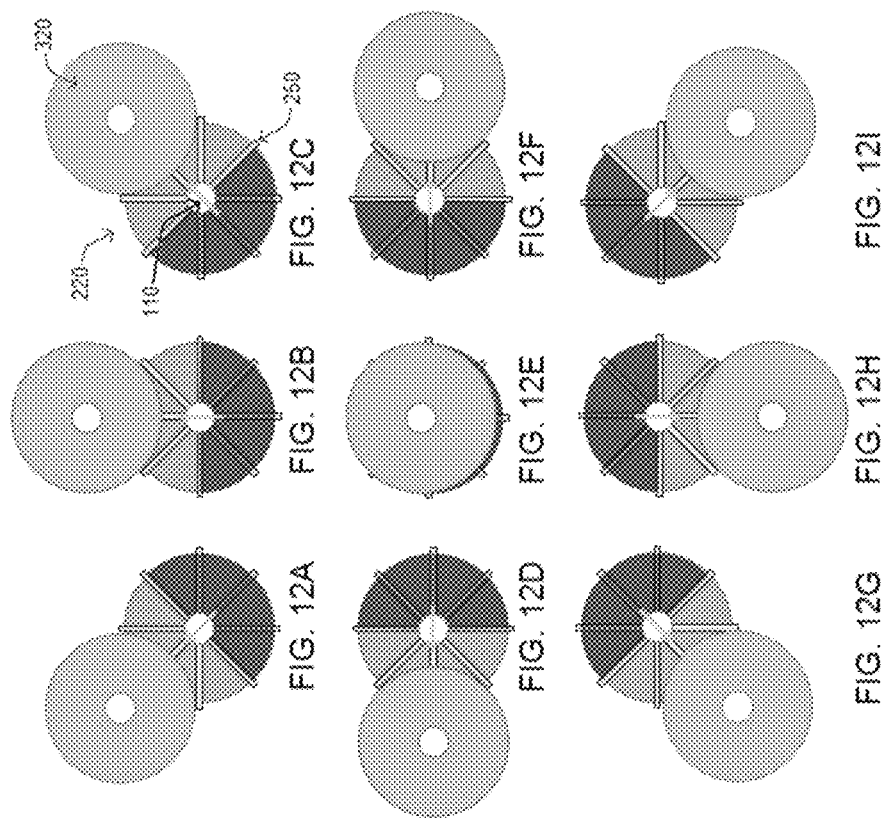
FIGS. 12A-12I illustrate example simplified top views of a primary coil having multiple rows of cross-coil junction units in varying degrees of misalignment with a secondary coil.

Referring again to FIGS. 6A and 6B, the plurality of cross-coil junction units 250 may be disposed along one row or line traversing a diameter of the top coil 230 and the bottom coil 240. However, the arrangement of the cross-coil junction units 250 are not limited to a single row traversing a diameter of the top coil 230 and the bottom coil 240. In this regard, FIG. 11 illustrates an example simplified top view of the primary coil embodying an alternate arrangement of cross-coil junction units. As shown in FIG. 11, the primary coil 220 may include multiple rows of cross-coil junction units 250. That is, the cross-coil junction units 250 may be disposed along multiple lines traversing a diameter of the top coil 230 and the bottom coil 240.

In the configuration of cross-coil junction units 250 shown in FIG. 11, each line of cross-coil junction units 250 is angularly offset from an adjacent line of cross-coil junction units 250 by 45 degrees. However, the arrangement of cross-coil junction units 250, including the number of rows of cross-coil junction units 250, the spacing of adjacent cross-coil junction units 250, and so forth, can vary according to the particular application. By varying the number of rows of cross-coil junction units 250 in the primary coil 220 and/or varying the spacing of adjacent cross-coil junction units 250 in the primary coil 220, it is possible to produce a magnetic flux 110 that is directed in various dimensions.

FIGS. 12A-12I illustrate example simplified top views of a primary coil having multiple rows of cross-coil junction units in varying degrees of misalignment with a secondary coil. As shown in FIGS. 12A-12I, the primary coil 220 may include multiple rows of cross-coil junction units 250, where each row of cross-coil junction units 250 is angularly offset from an adjacent row of cross-coil junction units 250 by 45 degrees, mirroring the arrangement shown in FIG. 11. In FIGS. 12A-12I, the lightly shaded area of the primary coil 220 indicates that electric current is flowing through the bottom coil 240, and the darkly shaded area of the primary coil 220 indicates the electric current is flowing through the top coil 230.

While a primary coil 220 having a single row of cross-coil junction units 250 traversing the diameter of the primary coil 220 is capable of at least three distinct current flow configurations, e.g., as demonstrated in FIG. 9, the primary coil 220 including multiple rows of cross-coil junction units 250 traversing the diameter of the primary coil 220 at an angular offset from each adjacent row of 45 degrees may be capable of at least nine distinct current flow configurations, as demonstrated in FIGS. 12A-12I. To this point, the cross-coil junctions 250 shown in FIGS. 12A-12I can be controlled so as to route current through specific sections of the top coil 230 and bottom coil 240 to produce an optimal angle of magnetic flux 110 to wirelessly charge the vehicle 210, based on the misalignment, if any, between the primary coil 220 and the secondary coil 320. The primary coil 220 can, as a result, compensate for misalignment of the secondary coil 320 in both the x-axis and the y-axis (e.g., see FIG. 3). This is beneficial as it adapts to the vehicle's position within a given lane and allows for greater flexibility in the vehicle's lane position (i.e., the vehicle need not drive precisely along the center of the lane).

For instance, following the top-down perspective adopted in FIGS. 12A-12I, if the secondary coil 320 is positioned forward and left of the primary coil 220 (see FIG. 12A), the wireless charging controller can control the cross-coil junction units 250 such that electric current flowing through the primary coil 220 (i.e., the top coil 230 and bottom coil 240) produces a magnetic flux 110 that is angled toward the secondary coil 320 (i.e., forward and left of the primary coil 220). Further, if the secondary coil 320 is positioned forward of the primary coil 220 (see FIG. 12B), the wireless charging controller can control the cross-coil junction units 250 such that electric current flowing through the primary coil 220 produces a magnetic flux 110 that is angled toward the secondary coil 320 (i.e., forward of the primary coil 220). Further, if the secondary coil 320 is positioned forward and right of the primary coil 220 (see FIG. 12C), the wireless charging controller can control the cross-coil junction units 250 such that electric current flowing through the primary coil 220 produces a magnetic flux 110 that is angled toward the secondary coil 320 (i.e., forward and right of the primary coil 220). This same concept is repeated throughout FIGS.

12D-12I, whereby the direction of the magnetic flux 110 can be optimally adjusted by controlling the cross-coil junction units 250 to compensate for several types of misalignment between the primary and secondary coils. It should be apparent that little to no misalignment is present in FIG. 12E, and thus, the cross-coil junction units 250 can be controlled to not block current from passing through. In such case, electric current flows only through the top coil 230, producing a vertical magnetic flux 110.

Figure 13:
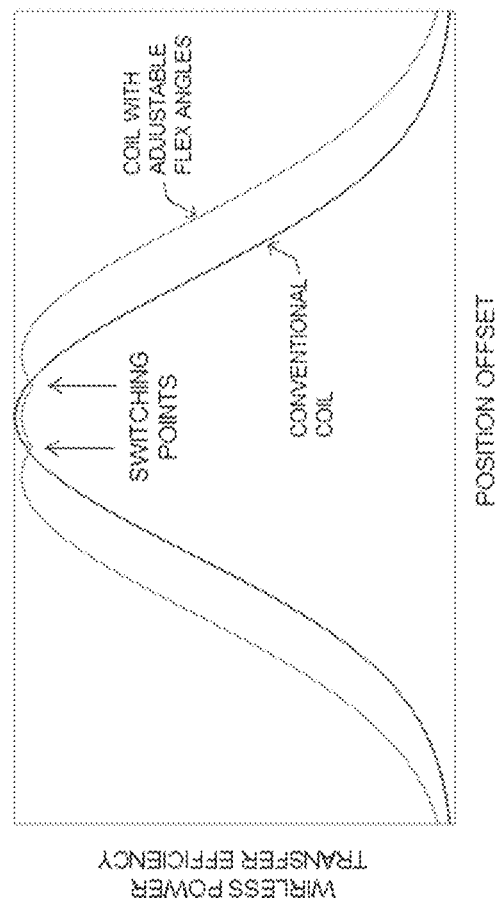
FIG. 13 illustrates an example depiction of wireless power transfer efficiency with a power transmitting coil having an adjustable flux angle, as described herein, in comparison with a conventional coil.

FIG. 13 illustrates an example depiction of wireless power transfer efficiency with a power transmitting coil having an adjustable flux angle, as described herein, in comparison with a conventional coil. As shown in FIG. 13, the wireless power transfer efficiency of the power transmitting coil with an adjustable flux angle described herein is improved over that of a conventional coil when the position of the primary coil 220 is misaligned with (i.e., positionally offset from) the secondary coil 320. This is because electric current flow through the primary coil 220 can be manipulated in a manner which allows for an angled magnetic flux 110, as described above.

In order for the primary coil 220 having an adjustable flux angle to achieve greater levels of power transfer efficiency in a dynamic charging system 400 where the vehicle 210 is in motion, the flux angle of the primary coil 220 needs to switch at the correct time in accordance with the changing position of the vehicle 210. To this end, two exemplary switching points are identified in FIG. 13 which represent approximate optimal points for the primary coil 220 to change flux direction. That is, the switching points show where the adjustable flux coil assembly should reroute current flow to create a new flux angle.

The physical distance between the switch points depends on the particular coil configuration within a dynamic charging system as well as the coil-to-coil z-gap (i.e., the distance between primary and secondary coils). In some implementations, for example, the distance between switch points could be approximately 5 cm. As such, in an example scenario where a vehicle is traveling 100 km/h, the maximum switching frequency required of the primary coil 220 is about 560 Hz, which can be achieved with field-effect transistors (FETs) generally known in the art.

Figure 14A:
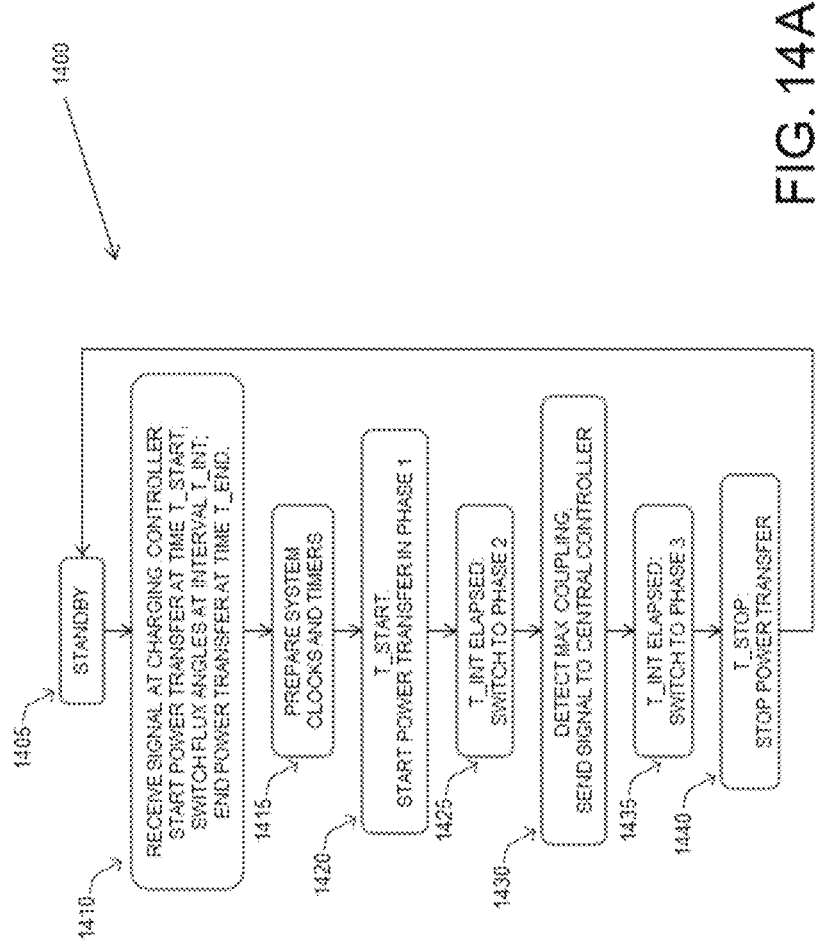
FIG. 14A illustrates an example simplified charging process from the perspective of a single primary coil.
Figure 14B:
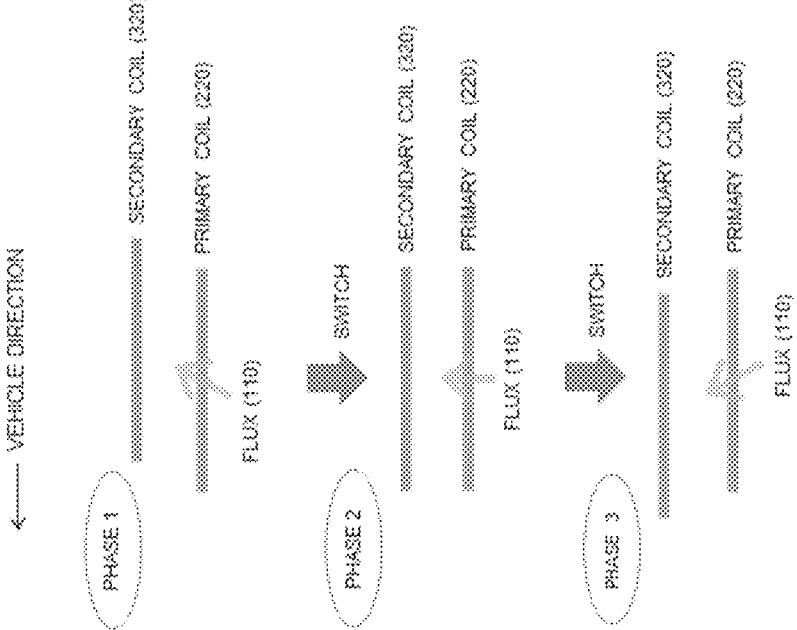
FIG. 14B illustrates a corresponding example diagrammatic representation of switching times when the primary coil is controlled to switch the direction of magnetic flux.

FIG. 14A illustrates an example simplified charging process from the perspective of a single primary coil. The procedure 1400 may start at step 1405, and continue to step 1410, where, as described in greater detail herein, the magnetic flux angle 110 produced by the primary coil 220 can switch at particular times as a moving, wireless charging-capable vehicle 210 traverses the primary coil 220. FIG. 14B, meanwhile, illustrates a corresponding example diagrammatic representation of switching times when the primary coil 220 is controlled to switch the direction of magnetic flux 110. Multiple current flow "phases" are shown in FIG. 14B, each exhibiting its own unique flux angle.

At step 1410, a signal is received at a wireless charging controller controlling operation of a wireless charging system (e.g., wireless charging system 200 or dynamic charging system 400) indicating that wireless charging is desired. The signal can be transmitted by a wireless charging-capable vehicle as it approaches the charging system, for example. In response, the controller can prepare for activation of wireless charging of the moving vehicle by initiating charging variables, such as power transfer start time T_START, flux angle switch intervals T_INT, power transfer end time T_END, magnetic flux switching times, and the like. The charging variables can be calculated using information received from the approaching vehicle including current vehicle position, current vehicle speed, and the like. Such information can be utilized to determine when the vehicle will reach the primary coil 220, how quickly the vehicle will traverse the primary coil 220, etc. At step 1415, the controller can also prepare system clocks or timers in order to track the time-based charging variables (e.g., T_START, T_INT, T_END, etc.). For instance, magnetic flux switching times (or "switching times"), which represent times at which wireless power transfer efficiency between the primary 220 coil and the secondary coil 320 will improve by altering an angle of the magnetic flux 110, can be calculated according to the detected speed of the vehicle and the detected position of the vehicle. Additionally, the switching interval (T_INT) can be calculated according to the detected speed of the vehicle, and the switching times can occur whenever the switching interval elapses. Precise switching time calculation is described in further detail below with respect to FIG. 15.

At step 1420, wireless power transfer is initiated (at T_START) by causing electric current to flow through the primary coil 220. As shown in FIG. 14B, wireless power transfer is initiated when the secondary coil 320 installed in the vehicle 210 is positioned behind the primary coil 220 in the vehicle moving direction ("Phase 1"). At this time, the secondary coil 320 and the primary coil 220 are misaligned. In response, electric current flowing through the primary coil 220 can be controlled to maximize wireless power transfer efficiency in light of the misalignment of the coils. More specifically, the cross-coil junction units 250 disposed between top and bottom coils of the primary coil 220 can be controlled to allow electric current to flow through a section of the top coil 230, pass through the cross-coil junction units 250, and flow through a section of the bottom coil 240, thereby generating an angled magnetic flux 110 directed toward the misaligned secondary coil 320. With reference to FIG. 9, the third current flow configuration can be selected in this scenario, as the magnetic flux 110 resulting from electric current flowing through the primary coil 220 in the third current flow configuration is offset from the vertical axis 120 and directed toward the secondary coil 320 positioned behind the primary coil 220 in the vehicle moving direction. That is, the resultant magnetic flux 110 is optimal for wirelessly charging the vehicle 210 given a position of the primary coil 220 in relation to a position of the secondary coil 320, as compared to the other current flow configurations.

After the switching interval T_INT has elapsed, a first switching time can occur whereby the primary coil 220 is controlled to re-route electric current flowing therethrough and switch the direction of magnetic flux 110 (step 1420). As shown in FIG. 14B, the vehicle 210 continues to traverse the primary coil 220 in the vehicle moving direction, and now the secondary coil 320 installed in the vehicle 210 may be positioned directly above the primary coil 220 ("Phase 2"). At this time, the secondary coil 320 and the primary coil 220 are properly aligned. Because of this, the primary coil 220 can be controlled to allow electric current to flow therethrough in a conventional manner, as shown in FIG. 1, for example. That is, the cross-coil junction units 250 disposed between top and bottom coils of the primary coil 220 can be controlled to prohibit electric current from passing through, resulting in current flowing through the top coil 230 only, thereby generating magnetic flux 110 that is directed upward toward the aligned secondary coil 320. With reference to FIG. 9, the first current flow configuration can be selected in this scenario, as the magnetic flux 110 resulting from electric current flowing through the primary coil 220 in the first current flow configuration is parallel to the vertical axis 120 and directed toward the secondary coil 320 positioned directly above the primary coil 200. That is, the resultant magnetic flux 110 is optimal for wirelessly charging the vehicle 210 given a position of the primary coil 220 in relation to a position of the secondary coil 320, as compared to the other current flow configurations.

At step 1430, the controller can receive a signal from the primary coil 220 indicating that the primary coil 220 and secondary coil 320 have achieved a maximum coupling state, which occurs when the primary and secondary coils are in perfect alignment with one another. In this regard, the charging system circuitry can be utilized to monitor a level of voltage or current in the primary coil 220 as the vehicle 210 traverses the primary coil 220 in order to detect when a state of maximum coupling between the primary and secondary coils occurs. When the vehicle 210 is directly overhead the primary coil 220, a change in voltage and/or current in the primary coil 220 occurs because of reflected impedance due to mutual inductance. When this occurs, the primary coil 220 can communicate the vehicle position to the controller in order to inform the controller that the secondary coil 320 is currently positioned directly above the primary coil 220.

After the switching interval T_INT has elapsed again, a second switching time can occur whereby the primary coil 220 is controlled to re-route electric current flowing therethrough and switch the direction of magnetic flux 110 (step 1435). As shown in FIG. 14B, the vehicle 210 continues to traverse the primary coil 220 in the vehicle moving direction, and now the secondary coil 320 installed in the vehicle 210 may be positioned ahead of the primary coil 220 in the vehicle moving direction ("Phase 3"). At this time, the secondary coil 320 and the primary coil 220 are again misaligned. In response, electric current flowing through the primary coil 220 can be controlled to maximize wireless power transfer efficiency in light of the misalignment of the coils. More specifically, the cross-coil junction units 250 disposed between top and bottom coils of the primary coil 220 can be controlled to allow electric current to flow through a section of the top coil 230, pass through the cross-coil junction units 250, and flow through a section of the bottom coil 240, thereby generating an angled magnetic flux 110 directed toward the misaligned secondary coil 320. With reference to FIG. 9, the second current flow configuration can be selected in this scenario, as the magnetic flux 110 resulting from electric current flowing through the primary coil 220 in the second current flow configuration is offset from the vertical axis 120 and directed toward the secondary coil 320 positioned ahead of the primary coil 220 in the vehicle moving direction. That is, the resultant magnetic flux 110 is optimal for wirelessly charging the vehicle 210 given a position of the primary coil 220 in relation to a position of the secondary coil 320, as compared to the other current flow configurations.

The procedure 1400 illustratively ends at step 1440 (T_STOP) when wireless power transfer is stopped. By switching the direction of magnetic flux 110 using the techniques described herein in coordination with the position of the moving vehicle 210 as it traverses the primary coil 220, the coupling efficient and overall wireless power transfer efficiency between the primary and secondary coils can be enhanced, particularly when the coils are misaligned, as compared to conventional coils.

The techniques by which the steps of procedure 1400 may be performed, as well as ancillary procedures and parameters, are described in detail above. It should be noted that the steps shown in FIG. 14A are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims. Moreover, while FIG. 14B shows three charging phases, any number of charging phases is possible based on a desired number of unique flux angles. As the number of current flow configurations increase (based on, for example, an arrangement of cross-coil junction units, an arrangement of coils within the primary coil, etc.), thus increasing the amount of unique flux angles possible, precision of the wireless charging system can also increase.

FIG. 15 illustrates an example simplified charging process in a dynamic charging system including a series of primary coils. The procedure 1500 may start at step 1505, and continue to step 1510, where, as described in greater detail herein, a dynamic charging system 400 embedded in a roadway or the like including multiple primary coils 220 with adjustable flux angles wirelessly charges a moving vehicle traversing the coils.

At steps 1505 and 1510, communications can be established between a moving, wireless charging-capable vehicle 210 and the dynamic charging system 400 upon a request for wireless charging being transmitted by the vehicle 210 to the dynamic charging system 400, which can respond to the vehicle 210 indicating that the system 400 is able to charge the vehicle 210. After receiving confirmation that wireless charging is available, the vehicle 210 can provide information such as speed, direction, and location to the dynamic charging system 400, which allows the system 400 to establish a charging schedule, including flux angle switching times (shown in FIGS. 14A and 14B), charging activation time, charging ending time, etc. For example, the vehicle 210 can transmit to the dynamic charging system 400 a signal indicating a current speed of the vehicle 210, a global positioning system (GPS) signal indicating a location of the vehicle 210, or other signals indicating a speed, direction, and/or location of the vehicle 210 (steps 1515 and 1520). These signals can be transmitted from the vehicle 210 to the charging system 400 on a periodic basis to update speed/location/direction information of the vehicle 210 as these values may change. Using the vehicle's speed and position, the charging system 400 can estimate the time until the vehicle 210 reaches not only the first primary coil 220 but also subsequent primary coils 220a, as well as the switching time interval (T_INT) between switching internal current flow configurations of a given primary coil.

In addition, calculating optimal flux angle switching times can depend on the coil-to-coil z-gap (i.e., distance between primary and secondary coils). As such, the vehicle 210 can also transmit its coil-ground clearance to allow the charging system 400 to estimate the z-gap. Signals can be communicated from the vehicle 210 to the charging system 400 using communication techniques known in the art (e.g., 802.11).

At step 1525, the charging system 400 can calculate the estimated time of arrival (ETA) of the vehicle 210 at the first primary coil 220 in the series of coils. The ETA of the vehicle 210 can be calculated based on vehicle speed and vehicle position (provided by the vehicle 210 in steps 1515 and 1520). The charging controller can activate the first primary coil 220 at the calculated ETA to coincide with the vehicle's arrival at the first primary coil 220. The first primary coil 220, as well as other primary coils 220a in the dynamic charging system 400, can be controlled in the manner described and shown in FIGS. 14A and 14B by controlling current flow configurations to switch magnetic flux angles as the vehicle 210 drives over the series of coils (step 1535).

Notably, precise detection of the vehicle location (to the millimeter) can be needed to energize the coils of the dynamic charging system 400 properly, that is, to calculate magnetic flux switching times which accurately correspond to the changing position of the secondary coil 320 as the vehicle 210 is in motion in relation to the primary coil 220. Thus, in order to obtain a more precise estimation of the position of the vehicle 210 as it traverses the primary coils 220 which may not be possible when relying solely on GPS data provided by the vehicle 210, voltage or current levels of the first primary coil 220 (or any primary coil 220 to which the vehicle 210 is closest) can be monitored to determine when the primary and secondary coils reach a state of maximum coupling, indicating that the secondary coil 320 is positioned directly above the primary coil 220.

To this end, at step 1530, the charging controller can activate the first primary coil 220 in a low-power mode according to the vehicle ETA calculated in step 1525. Then, the charging system circuitry can be utilized to monitor a level of voltage or current in the primary coil 220 as the vehicle 210 traverses the primary coil 220 in order to detect when a state of maximum coupling between the primary and secondary coils occurs. When the vehicle 210 is directly overhead the primary coil 220, a change in voltage and/or current in the primary coil 220 will occur because of reflected impedance due to mutual inductance. When this occurs, the primary coil 220 can communicate the vehicle position to the controller in order to inform the controller that the secondary coil 320 is currently positioned directly above the primary coil 220 (step 1540).

Using the precise vehicle location, the charging controller can accurately calculate the ETA of the vehicle 210 at the subsequent primary coils 220a (step 1545) and activate the subsequent primary coil 220a according to the calculated ETA (step 1550). This process of reporting mutual impedance measurements can be repeated at each primary coil to update the vehicle location until the vehicle 210 reaches the end of the dynamic charging system 400 (step 1555). In this manner, precise switching times (demonstrated in FIGS. 14A and 14B) can be calculated so as to adjust the angle of flux 110 at the appropriate moment, according to the position of the energized primary coil 220 in relation to the position of the secondary coil 320 which is always changing.

The techniques by which the steps of procedure 1500 may be performed, as well as ancillary procedures and parameters, are described in detail above. It should be noted that the steps shown in FIG. 15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Figure 16:
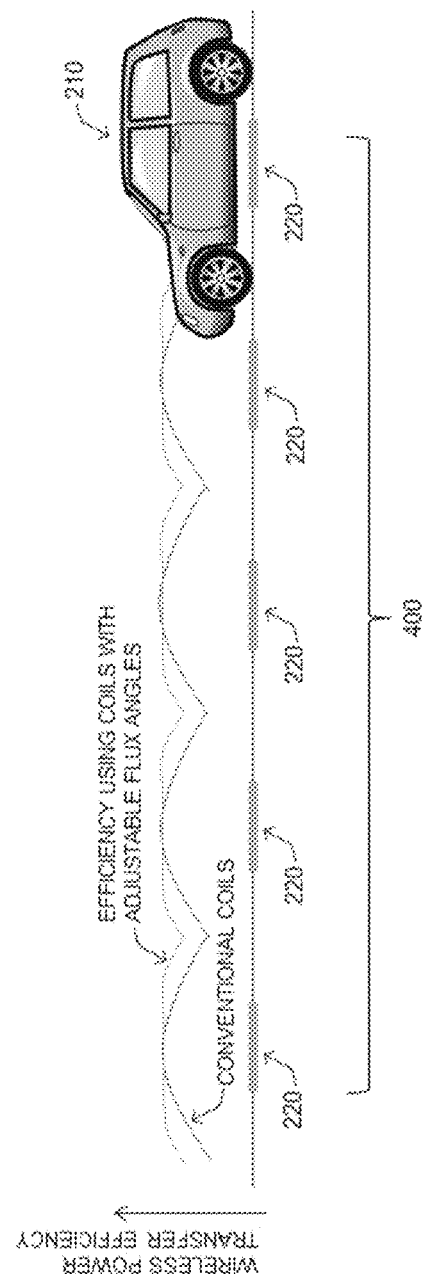
FIG. 16 illustrates an example comparison of wireless power transfer efficiency exhibited with a coil having an adjustable flux angle and a conventional coil.

By adjusting the angle of magnetic flux 110 created by current flowing through the primary coil 220 in accordance with the position of the primary coil 220 in relation to the secondary coil 320 of a vehicle 210, wireless power transfer efficiency between the primary and secondary coils can be enhanced particularly when the primary and secondary coils are misaligned. As shown in FIG. 16, which illustrates an example comparison of wireless power transfer efficiency exhibited with a coil having an adjustable flux angle and a conventional coil, the wireless power transfer efficiency of a dynamic charging system 400 which utilizes coils having an adjustable flux angle, as described hereinabove, is improved when the vehicle 210 is positioned between two adjacent primary coils 220, resulting in misalignment of the primary and secondary coils. By reducing the sequential drop in power transfer efficiency which typically occurs as the vehicle 210 is traveling over the coils 220, the dynamic charging system 400 is able to deliver a more robust wireless charge while also minimizing power pulsations common to conventional coils, which negatively affect the power grid, without the need of ultra-capacitors.

Accordingly, techniques are described herein that provide for utilizing a power transmitter coil assembly including multiple parallel coils with cross-coil junction units disposed between them. The cross-coil junction units can be controlled to guide electric current through specific parts of the coils and effectively create different current flow configurations. Each current flow configuration produces a unique angle of magnetic flux. Therefore, the efficiency of wireless charging systems can be improved by adjusting the magnetic flux angle to optimally couple with a power receiving coil installed in the vehicle to be charged, without any physically moving parts. Further, the magnetic flux angle can be adjusted at specific switching times as the vehicle traverses a single transmitting coil or a series of transmitting coils (i.e., a dynamic charging system). In this manner, the flux angle can be automatically redirected as the receiving coil of the vehicle moves over the transmitting coil to ensure optimal coupling between the coils even during misalignment.

While there have been shown and described illustrative embodiments that provide for a wireless charging system for electric vehicle with an adjustable flux angle, it is to be understood that various other adaptations and modifications may be made within the spirit and scope of the embodiments herein. For example, the embodiments have been primarily shown and described herein with relation to a primary coil with multiple layers of parallel coils. However, the embodiments in their broader sense are not as limited, as the same concepts as described herein could alternatively or additionally be applied to the receiving coil. Further, while the embodiments have been primarily shown and described herein with relation to wireless vehicular charging, the embodiments in their broader sense are not as limited, as the same concepts as described herein could alternatively be applied to wireless charging of non-vehicular devices. Accordingly, the disclosed embodiments may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method comprising:
 detecting a position of a moving, wireless charging-capable vehicle which travels over a primary coil of a wireless charging system operable to wirelessly charge the vehicle via a secondary coil installed in the vehicle, wherein the primary coil includes a top coil and a bottom coil that are substantially parallel to one another, the top coil and the bottom coil coupled to one another via a plurality of cross-coil junction units that permit electric current to pass from one of the top coil and the bottom coil to the other of the top coil and the bottom coil;

controlling the plurality of cross-coil junction units such that electric current flows through one or both of the top coil and the bottom coil in a manner which produces a first angle of magnetic flux for optimally wirelessly charging the vehicle given a position of the primary coil in relation to the detected position of the vehicle; and when a switching time occurs, controlling the plurality of cross-coil junction units to change the flow of electric current through one or both of the top coil and the bottom coil in a manner which produces a second angle of magnetic flux for optimally wirelessly charging the vehicle given the position of the primary coil in relation to an updated position of the vehicle as the vehicle traverses the primary coil, wherein the first angle of magnetic flux is different than the second angle of magnetic flux.

2. The method of claim 1, wherein the switching time is a time at which wireless power transfer efficiency between the primary coil and the secondary coil will improve by altering an angle of the magnetic flux produced by the primary coil.

3. The method of claim 1, further comprising:
calculating the switching time according to a speed of the vehicle and the detected position of the vehicle.

4. The method of claim 1, further comprising:
calculating a switching interval according to the speed of the vehicle,
wherein the switching time occurs once the switching interval has elapsed after activation of the wireless charging.

5. The method of claim 1, wherein, as the vehicle traverses the primary coil:
the first angle of magnetic flux is produced when the secondary coil is at a first position, and
the second angle of magnetic flux is produced when the secondary coil is at a second position that is forward the first position in a moving direction of the vehicle.

6. The method of claim 1, further comprising:
when another switching time occurs, controlling the plurality of cross-coil junction units to change the flow of electric current through one or both of the top coil and the bottom coil in a manner which produces a third angle of magnetic flux for optimally wirelessly charging the vehicle given the position of the primary coil in relation to another updated position of the vehicle as the vehicle traverses the primary coil,
wherein the third angle of magnetic flux is different than the first and second angles of magnetic flux.

7. The method of claim 6, further comprising:
calculating a switching interval according to a speed of the vehicle,
wherein the other switching time occurs once the switching interval has elapsed after occurrence of the switching time.

8. The method of claim 6, wherein, as the vehicle traverses the primary coil:
the first angle of magnetic flux is produced when the secondary coil is at a first position,
the second angle of magnetic flux is produced when the secondary coil is at a second position that is forward the first position in a moving direction of the vehicle, and
the third angle of magnetic flux is produced when the secondary coil is at a third position that is forward the first and second positions in the moving direction of the vehicle.

9. The method of claim 6, wherein, as the vehicle traverses the primary coil:
the first angle of magnetic flux is produced when the secondary coil is positioned to a first side of the primary coil,
the second angle of magnetic flux is produced when the secondary coil is positioned directly above the primary coil, and
the third angle of magnetic flux is produced when the secondary coil is positioned to a second side of the primary coil opposite the first side.

10. The method of claim 1, wherein the detecting of the position of the vehicle comprises:
receiving GPS information from the vehicle; and
estimating the position of the vehicle based on the received GPS information.

11. The method of claim 1, wherein the primary coil is one of a plurality of primary coils arranged sequentially in a dynamic wireless charging system.

12. The method of claim 11, further comprising:
monitoring a first primary coil of the plurality of primary coils;
detecting the position of the vehicle as the vehicle traverses the first primary coil; and
activating a second primary coil of the plurality of the primary coils subsequent to the first primary coil based on the position of the vehicle detected as the vehicle traverses the first primary coil.

13. The method of claim 12, wherein the detecting of the position of the vehicle as the vehicle traverses the first primary coil comprises:
activating a low-power mode of the first primary coil;
monitoring a level of voltage or current in the first primary coil as the vehicle traverses the first primary coil; and
determining that the vehicle is positioned directly above the first primary coil when the monitored level of voltage or current in the primary coil indicates a maximum coupling state between the first primary coil and the secondary coil.

14. The method of claim 13, further comprising:
estimating a time at which the vehicle will arrive at the second primary coil according to a speed of the vehicle and the position of the vehicle determined when the maximum coupling state between the first primary coil and the secondary coil occurs; and
activating the second primary coil as the vehicle at the estimated time.

15. The method of claim 1, wherein, when the vehicle is positioned such that the secondary coil is misaligned with the primary coil, the first or second angle of magnetic flux for optimally wirelessly charging the vehicle is an angle offset from a vertical axis extending upwardly from the primary coil.

16. The method of claim 1, wherein one end of each cross-coil junction unit is connected to the top coil, and another end of each cross-coil junction unit is connected to the bottom coil.

17. The method of claim 1, wherein the plurality of cross-coil junction units are disposed along one line traversing a diameter of the top coil and the bottom coil.

18. The method of claim 1, wherein the plurality of cross-coil junction units are disposed along multiple lines traversing a diameter of the top coil and the bottom coil.

19. The method of claim 18, wherein each line of cross-coil junction units is angularly offset from an adjacent line of cross-coil junction units by 45 degrees.

20. A wireless charging system comprising:
   a primary coil that is operable to wirelessly charge a moving, wireless charging-capable vehicle which travels over the primary coil,
   wherein the primary coil charges the vehicle via a secondary coil installed in the vehicle, the primary coil including a top coil and a bottom coil that are substantially parallel to one another, the top coil and the bottom coil coupled to one another via a plurality of cross-coil junction units that permit electric current to pass from one of the top coil and the bottom coil to the other of the top coil and the bottom coil; and
   a wireless charging controller configured to:
      detect a position of the vehicle which travels over the primary coil,
      control the plurality of cross-coil junction units such that electric current flows through one or both of the top coil and the bottom coil in a manner which produces a first angle of magnetic flux for optimally wirelessly charging the vehicle given a position of the primary coil in relation to the detected position of the vehicle, and
      when a switching time occurs, control the plurality of cross-coil junction units to change the flow of electric current through one or both of the top coil and the bottom coil in a manner which produces a second angle of magnetic flux for optimally wirelessly charging the vehicle given the position of the primary coil in relation to an updated position of the vehicle as the vehicle traverses the primary coil,
   wherein the first angle of magnetic flux is different than the second angle of magnetic flux.

* * * * *